May 31, 1966     D. P. CLAYTON     3,253,510
TWO POSITION NON-GLARE MIRROR
Filed Aug. 27, 1962     2 Sheets-Sheet 1

INVENTOR.
David P. Clayton
BY Paul J. Leising
ATTORNEY

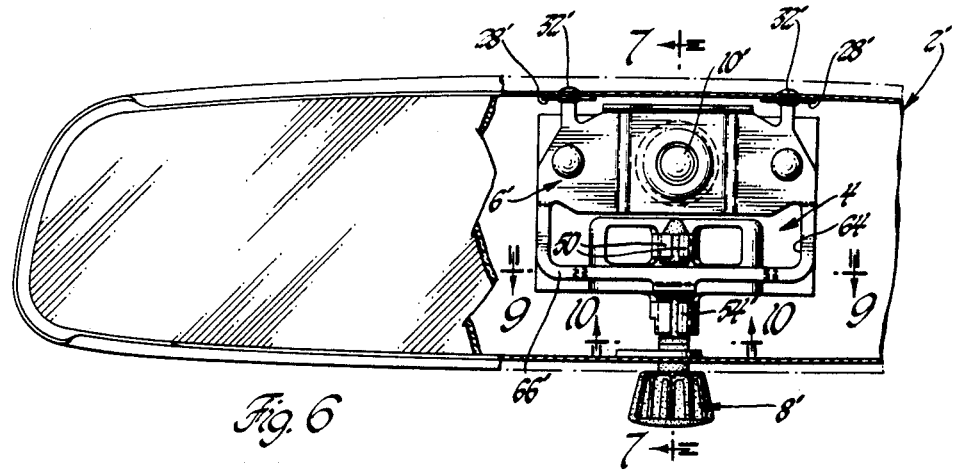
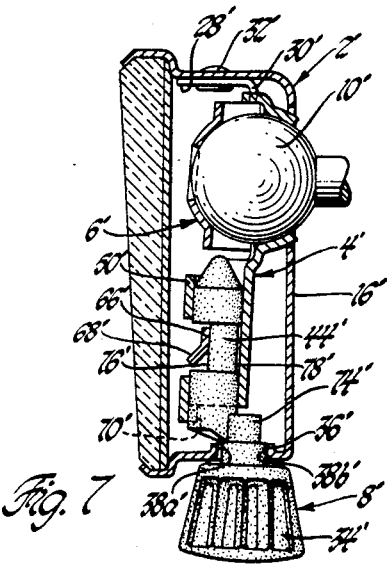

United States Patent Office 3,253,510
Patented May 31, 1966

---

3,253,510
TWO POSITION NON-GLARE MIRROR
David P. Clayton, Anderson, Ind., assignor to General Motors Corporation, Detroit, Mich., a corporation of Delaware
Filed Aug. 27, 1962, Ser. No. 219,485
15 Claims. (Cl. 88—77)

This is a continuation-in-part of my application, S.N. 73,372 filed December 2, 1960, now abandoned.

This invention pertains to non-glare or anti-glare rear view mirrors of the type comprising a tiltable or pivotable mirror element having two reflecting surfaces of different reflecting powers and, in particular, to a means for mounting such a mirror on a relatively fixed support for tiltable or pivotal adjustment of the mirror relative to said support.

In recent years, the development of tilt-type non-glare mirrors has gone through two relatively distinct stages. Thus, one type of such a mirror which has found considerable favor in the art consists of a miror housing or frame and mirror means having two reflecting surfaces of different reflecting powers pivotally mounted for forward and rearward movement relative to such housing between "day" and "night" positions. In other words, in this type of construction, the mirror element itself is pivotally adjusted relative to its frame which, in turn, is carried by some fixed support. Various over-center spring arrangements are utilized in such a combination for controlling the tilting of the mirror within its housing, and in order to yieldingly maintain the mirror in either of its two extreme tilted positions. An example of such a mirror construction can be seen by referring to United States Patent No. 2,469,207, issued to Gordon E. Roedding on May 3, 1949.

The other distinct type of mirror assembly finding more recent favor in the art differs from the previously discussed construction in several respects but, for the purpose of this disclosure, particular reference is made to the feature of this later type of construction consisting of the reflective mirror element being rigidly supported in its frame or housing rather than movable relative thereto, and the housing in turn being pivotally mounted on a pivot or mounting plate disposed interiorly of the housing and carried on the usual ball stud support. An example of such a construction may be seen by referring to United States Patent No. 2,913,958, issued to H. C. Mead et al. on November 24, 1959. As will be seen from the Mead et al. patent, tilting movement of the housing, and hence the mirror element secured thereto, is accomplished by pivotal adjustment of an operating lever rotatably supported on the housing and operatively connected through spring means to the relatively fixed pivot or mounting plate. The present invention relates to an improvement in mirror constructions of the types aforementioned, and particularly that exemplified by the Mead et al. patent.

With reference to both of the prior art constructions aforementioned, it has been conventional practice to mount either the housing or mounting plate, whichever the case may be, to a ball stud by means of a relatively narrow strip of spring metal suitably secured to the mirror housing or mounting plate, again as the case may be, so as to form a socket construction adjustably frictionally embracing the ball stud. Referring specifically to the general class of mirrors to which the present invention pertains and as exemplified by Mead et al., this spring plate material is rigidly secured to the mounting plate and the mounting plate and the spring plate are provided with suitable socket members which cooperate in frictionally engaging the usual ball stud so as to support the mounting plate on the ball stud. The housing is then suitably pivotally mounted on the mounting or pivot plate, such as by conical headed rivets as shown particularly in Mead et al. Additionally, and as referred to above, in order to control tilting movement of the housing and the mirror fixed therein about its pivotal connection to the relatively fixed mounting plate, spring means is required to operate between the mounting plate and the housing or a movable operaing lever on the housing as shown in Mead et al.

It is, therefore, a principal object and feature of this invention to provide an improved mirror of the type shown in Mead et al. characterized by a simplified structure for mounting the mirror housing on its support for pivotal adjustment between "day" and "night" positions.

It is another object and feature of this invention to provide an improved rear view mirror assembly of the class described, which permits the mirror to be selectively adjusted from a "night" to "day" position by an attached operating lever, whereafter it may be automatically returned to the "day" position when the mirror housing is grasped for adjustment about its support stud.

It is another object and feature of this invention to provide an anti-glare or non-glare rear view mirror of the type comprising a housing in which there is positioned a mirror having two reflecting surfaces of different reflecting powers, a mounting or pivot plate carried on a suitable support and disposed interiorly of said housing, and characterized by means having the dual function of securing the pivot or mounting plate on the support and connecting the housing to the mounting plate for tiltable or pivotal movement relative thereto.

It is yet another object and feature of this invention to provide an improved rear view mirror assembly of the class described characterized by the combination of a relatively rigid mounting plate and a relatively flexible spring plate rigidly secured together to form a socket structure adjustably frictionally engaging the usual ball stud mirror support, integral means on the spring plate rigidly secured to the housing to mount the latter and always tending to urge or bias the housing tiltably or pivotally in one direction relative to the relatively fixed mounting plate, and an operating lever rotatably supported by the mounting plate and including eccentrically positioned portions to control movement of the housing relative to the mounting plate under the influence of the spring plate means connected between the latter and the housing.

It is still another object and feature of this invention to provide a mirror of the class described in which a single member, the spring late aforementioned, functions to aid in supporting the mirror assembly on the usual ball stud support, to support the housing for tilting movement relative to the mounting plate and to provide the spring action required to accomplish tilting adjustment of the housing relative to the mounting plate in accordance with selective rotation of an operating lever rotatably supported on the mounting plate and operatively engaging the housing.

These and other objects and features of this invention will become more apparent hereinafter as the description proceeds, and in which references made to the drawings in which:

FIGURE 6 is a front elevation view of a modified form of the invention shown in FIGS. 1–5;

FIGURE 7 is an enlarged cross-sectional view taken on line 7—7 of FIGURE 6 and showing the mirror assembly in its "day" position;

FIGURE 8 is a cross section view corresponding generally to FIGURE 7, however showing the mirror assembly in its "night" position;

FIGURE 9 is a view taken on line 9—9 of FIGURE 6;

FIGURE 10 is a view taken on line 10—10 of FIGURE 6; and

FIGURE 11 is a view taken on line 11—11 of FIGURE 8.

Figure 1:
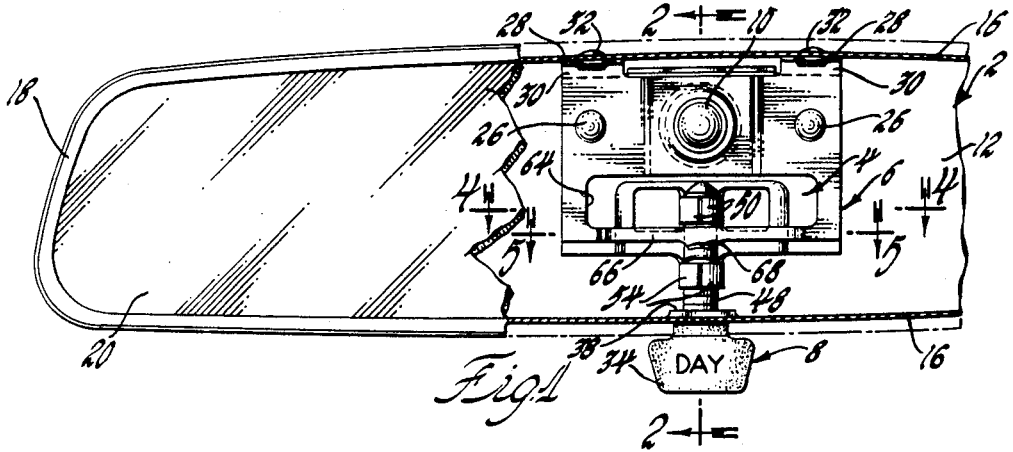
FIGURE 1 is a front elevational view of a preferred embodiment of the invention partially broken away to illustrate certain details of the structure.

Referring now to the drawings, there is shown a nonglare or anti-glare rear view mirror assembly comprising a mirror housing 2, a substantially rigid pivot or mounting plate 4, a flexible spring plate 6, an operating lever 8 and the usual ball stud 10 having the end thereof adapted for connection to an automotive vehicle in the usual manner.

The mirror housing 2 comprises a substantially cup-shaped elongate shell having a rear wall 12 having an aperture 14 therein through which the ball stud 10 extends into the housing interior, and a continuous forwardly extending side wall 16 in which, at its forward end, there is fixedly secured by the inturned flange 18 a conventional prismatic mirror 20 having two reflecting surfaces of different reflecting powers.

The substantially rigid pivot or mounting plate 4 is disposed within the interior of the mirror housing behind the mirror, and includes a parti-spherical socket member 22 embracing a portion of the ball stud 10 to the rear of the center of the latter. The spring plate 6 is of relatively flexible or yieldable material and includes a parti-spherical socket member 24 disposed opposite the socket member 22 and engaging a forward portion of the ball stud 10, lateral portions of the spring plate 6 and mounting plate 4 being rigidly secured together by suitable means as indicated at 26. As a consequence, the respective socket members 22 and 24 are urged toward each other so to frictionally engage the ball stud 10 while, at the same time, permitting manual adjustment of the position of the mounting plate-spring plate assembly on the ball stud.

Two laterally spaced ears 28 are formed integral with the upper edge of the spring plate 6 and are bent forwardly to form a flexible joint in the area indicated at 30. The free ends of ears 28 are secured to the upper portion of the mirror housing wall 16 above the axis of the ball stud 10 as by the rivets 32. Thus, the mirror housing 2 and the mirror 20 secured therein are supported relative to the mounting plate 4 and the ball studs 10.

At this juncture it should be noted that the angular relationship between the respective mounting ears 28 and the main body of the spring plate 6 is such that, when mounted as shown in the drawings, the mounting ears continuously urge the rear wall 12 of the housing in one direction relative to the mounting plate 4; that is, these ears tend to flex and pivot at the joint 30 to pivot the housing relative to the mounting plate so as to swing the lower portion of the housing away from the mounting plate. Thus, prior to assembly and in the preferred embodiment, the ears 28 are bent over to form an included angle of approximately 75 degrees between the ears and the main body of the spring plate 6. In other words, this is the angular relationship which exists when the ears 28 are unstressed relative to the main body of the spring plate prior to mounting the latter as previously described. However, after securing the spring plate to the relatively fixed mounting plate 4 and securing ears 28 to housing 2 and due to the lever 8 to be described, this angular relationship is always greater than 75 degrees as will be apparent from FIGURES 2 and 3. Consequently, the ears 28 constantly tend to flex and pivot counterclockwise in FIGURES 2 and 3 in the area of joints 30, but are prevented from returning to an unstressed condition relative to each other due to the operating lever 8 to be described. Accordingly, and as will appear hereinafter in conjunction with a description of the operating mechanism, the spring plate construction and particularly the flexible joints 30 are always under stress in either position of FIGURES 2 and 3 so as to hold the mirror housing 2 in any selected adjusted position in accordance with operation of the lever 8.

The lever mechanism 8 is an integral member preferably formed or molded from nylon or some other anti-friction material, and includes an externally accessible knob 34 immediately joined to a cylindrical cam or barrel 36 which is rotatable about a movable vertical axis in an aperture 38 formed in the lower portion of the wall 16 of mirror housing 2. As will be clear from FIGURES 1 through 3, the aperture 38 is elongated sufficiently to permit rotation of the cam 36 as will appear hereinafter. The inner end of the lever consists of two coaxial cylindrical barrels 40 and 42 joined by an intermediate spindle portion 44, the inner end of the lever terminating in a conical tapered portion 46. This inner lever construction is joined to the cam 36 and operating knob 34 by the offset portion 48 of the lever, whereby the common axis of the inner lever end and particularly the coaxial cam barrels 40 and 42 is parallel to but spaced a predetermined distance from the axis of the cam member 36 on the housing 2. A pair of ears 50 are pierced or otherwise formed out of the lower central portion of the mounting plate 4 to either side of an arcuate depression 52 in the latter, and have their free ends arcuately shaped in end-to-end relation so as to form a tubular support receiving and confining the upper barrel 40 for rotation about a fixed axis relative to the mounting plate. In similar fashion, the lower edge of the mounting plate includes two ears 54 and a depression 56 similarly shaped to form a second tubular bearing support similarly confining the lower barrel 42.

The spindle 44 includes the oppositely disposed flat surfaces 58 and 60 which are joined together by the oppositely disposed arcuate surfaces 62. Furthermore, and for a purpose to appear more fully hereinafter, the flat surface 58 is spaced further from the axis of rotation of the barrels 40 and 42 than is the other flat surface 60. As a result, the surface 60 is wider than surface 58.

Figure 2:
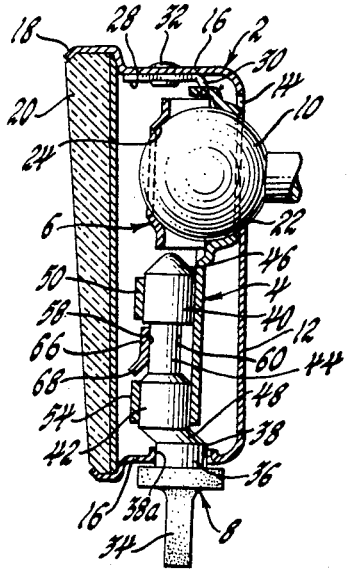
FIGURE 2 is an enlarged cross-sectional view taken on line 2—2 of FIGURE 1 showing the mirror assembly in its "day" position.
Figure 3:
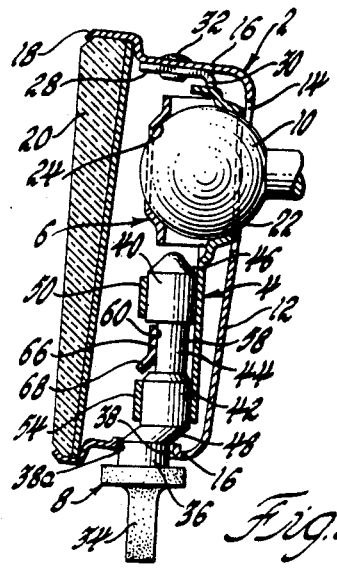
FIGURE 3 is a cross-sectional view corresponding generally to FIGURE 2, but showing the mirror assembly in its "night" position.
Figure 4:
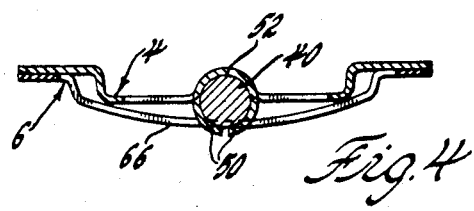
FIGURE 4 is a view taken on line 4—4 of FIGURE 1.
Figure 5:
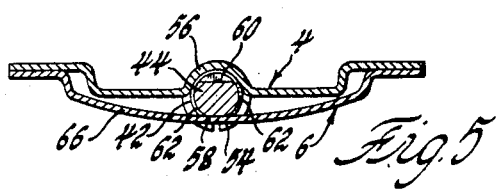
FIGURE 5 is a view taken on line 5—5 of FIGURE 1.

The lower portion of the spring plate 6 has an elongate opening 64 therein (see FIGURE 1) to permit the ears 50 to project therethrough, and terminates in a laterally extending flexible detent band 66 which selectively abuts one or the other of two flat surfaces 58 and 60 formed on the spindle 44 depending on the position of the lever. A tang 68 is bent outwardly from the band 66 adjacent the area of engagement of the latter with spindle 44. The resiliency of the band 66 in cooperation with arcuate surfaces 62 and one or the other of the flat surfaces 58 or 60 provides a definite "feel" to the operator of the mirror so that he may readily determine by feel alone that the mirror has reached one or the other of its two extreme adjusted positions as illustrated in FIGURES 2 and 3. Furthermore, the band cooperates with these detent surfaces to lock the housing in an adjusted position, and particularly the "night" position of FIGURE 3. In addition, however, and as suggested in FIGURE 1, the opposite sides of the knob 34 may be provided with suitable lettering so as to visually indicate whether the "day" or "night" mirror position has been selected.

In assembling the aforedescribed construction, the mounting plate 4 and spring plate 6 are secured together and on ball stud 10, and the housing is secured to the ears 28. At this time, the flexible joints 30 bias the lower edge of the housing to the right in FIGURES 2 and 3 as previously discussed. The barrel 40 is then inserted through the housing opening 38, and the housing and mounting plate-ball stud assemblies are manipulated to feed the barrel 40 through ears 54 into its support formed by ears 50 and depression 52. Naturally, barrel 42 is thus seated within its support. During this installation, the conical head 46 at the inner end of lever 8 and tang 68 cooperate to facilitate feed of the lever onto the mounting plate supports. Moreover, the detent band 66 flexes during entry of barrel 40 and snaps back against the spindle 44 beneath the barrel 40 after the latter is properly seated. Thus, the force exerted by band 66 and, of course, the locking action between band 66 and the shoulder at the lower end of cam 40 hold the lever 8 in position on the housing 2 and mounting plate 4.

Reference will now be made to the operation of the construction aforedescribed, it being assumed that the mirror assembly is disposed initially in the "day" position illustrated in FIGURE 2. In this position, as well as the position of FIGURE 3, the cooperation between the spring plate 6 and mounting plate 4, and particularly the socket members thereof, firmly frictionally holds the entire assembly on the ball stud 10 while at the same time permitting the vehicle operator to grasp the exterior of the housing 2 so as to adjust the angular relationship of the mirror assembly on the ball stud. Furthermore, and for any given position for the mounting plate-spring plate combination on the ball stud, the spring plate and particularly the flexible joints 30 between the main body of the spring plate and the flexible ears 28 continuously urge the lower portion of the housing away from the mounting plate 4; that is, urges the mirror housing to pivot about the axis of the flexible joints 30 so as to move the lower portion of the housing to the right in FIGURES 2 and 3. However, such movement is resisted or controlled by the operating lever inasmuch as the latter is firmly secured against translatory movement relative to the mounting plate 4. Thus, the forward portion 38a of aperture 38, under the influence of the spring, bears against the cam barrel 36 and cooperates therewith during rotation of the lever for adjusting the mirror. The rear portion 38b of the aperture does not engage the cam barrel 36 and hence serves no useful function other than closing the gap that might otherwise exist between the rear of the cam barrel 36 and the housing wall 16.

To tilt the mirror from the FIGURE 2 position to that of FIGURE 3, it is only necessary for the operator to manually rotate the knob 34 through 180 degrees which causes the cam 36 to rotate against the forward portion of the aperture and due to the cams eccentricity shift the lower portion of the mirror housing forwardly relative to the mounting plate 4 or to the left in FIGURES 2 and 3 as the housing pivots about a horizontal axis generally through the flexible joints 30 of the ears 28. In other words, the axis of rotation of the cam barrel 36 on housing 2 is shifted from the right side to the left side of the common axis of rotation of the barrels 40 and 42 on the relatively fixed mounting plate 4. The forward portion 38a of the elongate aperture accommodates cam barrel 36 during this rotation. This movement increases the stress in joints 30 for reasons aforementioned. Conversely, to redispose the assembly in the FIGURE 2 position, it is merely necessary to again rotate the lever 8 resulting in an action reverse to that described above.

As the lever is rotated to dispose the mirror in either the FIGURE 2 or the FIGURE 3 position as aforedescribed, the yieldable detent band 66 rides from one or the other of the flat surfaces 58 or 60 against one of the rounded side edges 62 of the spindle 44 and onto the other of the flat surfaces. As the detent member 66 so rides, it flexes to accommodate the curvature of the spindle and then engages a flat surface to provide a definite "feel" through the knob 34 to the operator to signify that the mirror is in a selected position, and also to positively retain the mirror in at least the FIGURE 3 position.

In this regard and as noted previously, the flat detent surface 58 for the "day" position is farther from the spindle axis and narrower than the flat surface 60 for the "night" position. The principal purpose for this relationship is to insure that the mirror housing 2 will be retained in the "night" position of FIGURE 3. In further explanation of this feature of the invention, it will be remembered that the flexible joints 30 constantly tend to drive the mirror housing toward the "day" position of FIGURE 2. Therefore, the flat surface 60 for the "night" position of FIGURE 3 must be wide enough to insure that the stress in joints 30 cannot inadvertently rotate lever 8 and accordingly housing 2 to the FIGURE 2 position in response to vibration and the like. Furthermore, from the foregoing, it will be obvious that the flat detent surface 58 for the "day" position is not absolutely necessary for the purpose of locking the housing 2 and lever 8 in the "day" position or to provide "feel," since the housing will tend to assume the "day" position once detent band 66 rides off detent surface 60 in the "night" position. However, flat detent surface 58 is preferably included to insure positive location and "feel" in the "day" position also. On the other hand, since locking is no great problem in the "day" position, the "day" detent surface can be narrower than surface 60 and, hence, further from the axis of spindle 44. Consequently, sufficient reaction results between detent band 66 and surface 58 to provide a definite feel in the "day" position.

Referring now to FIGURES 6–11 a modified form of the subject invention is shown, which in almost all respects is identical to the mirror assembly shown in FIGURES 1–5 except for a functional and structural difference. For this reason, corresponding primed numerals will be used to indicate corresponding parts found in the above-described mirror assembly.

The modified mirror assembly, as in the case of the assembly of FIGURE 1, comprises a mirror housing 2', a mounting plate 4', a flexible spring plate 6', an operating lever 8' and the usual ball stud 10'. Also, the inner end of the operating lever is supported by a combination of the tang 66' and the ears 50' and 54', however, in this instance, the latter ear is provided with a notched portion so as to define stops 70' and 72' which cooperate with an extension 74' integrally formed with the knob 34' for limiting rotation thereof to two extreme positions. Moreover, the spindle 44' has a single flat surface 76' while the opposite side 78' of the spindle is circular in shape. With regard to the spring plate 6', the ears 28' thereof are also rigidly secured to the mirror housing by rivets 32', but, in this assembly rather than bending the ears to form an included angle of approximately 75° between the ears and the main body of the spring plate 6', here the ears are bent to form an included angle of approximately 107°. Thus, in this mirror construction when the components thereof are assembled as shown in FIGURES 7 and 8, the ears 28' constantly tend to flex and pivot clockwise in the area of the joints 30' but are prevented from returning to an unstressed condition relative to each other due to the cam barrel 36' abutting the portion 38b' of the aperture 38'. Thus, and as in the case of the mirror assembly in FIGURE 1, the spring plate construction and particularly the flexible joints 30' are always under some stress in either position of FIGURES 7 and 8 so as to hold the mirror housing 2' in an adjusted position.

There are two significant functional changes in the modified mirror which have been brought about by the above-described structural changes. For example, in the mirror assembly of FIGURES 1–5, the operating lever is rotated a full 180° for positioning the mirror between a "day" and "night" position. In the modified form, however, the knob 34' is turned only 90° to accomplish the same movement. For example, as seen in FIGURE 7, the mirror assembly is shown in the "day" position and to move it to the "night" position of FIGURE 8, the knob 34' is simply rotated so as to cause the axis of the cam barrel 36' to move from its offset position with respect to the spindle axis to a position where it is aligned with the latter, when viewed in cross section, and the extension 74' contacts stop 70'. This movement of the cam barrel 36' permits the spring plate to shift the lower end of the mirror forwardly or clockwise about the ball stud 10' as viewed in FIGURE 8.

The other feature obtained by the modified mirror assembly is that the mirror moves from the "night" to the "day" position automatically when pressure is exerted on the mirror casing 2' to adjust it on the ball stud. The latter results from a combination of an increase in cam barrel eccentricity and the change in the included angle of the spring ears 28'. The significance of this change can be understood best by referring to FIGURE 7, and noting that when the mirror is assembled and is in the "day" position with the extension 74' abutting stop 72', the included angle between the ears 28' and the body of the spring plate 6' is decreased from 107° to approximately 85°. Hence, the spring plate acts through the detent band 66' and attached mounting plate 4' to cause the ears to exert a clockwise force about the joint 30' and thereby move the aperture portion 38b' into contact with the cam barrel. Thus, in the "day" position, the assembly is under the influence of the spring plate 6', and is held in this position by the detent band 66" seating in the flat surface 76' of the spindle 44' as shown in FIGURE 9. When the actuator 8' is rotated 90° to move the cam barrel towards the mounting plate, the spring plate supplies the motivating force to shift the housing forwardly in a clockwise direction about the ball stud and move it into the position of FIGURE 8 or the "night" position. Conversely, when the actuator is rotated from the "night" position to the "day" position of FIGURE 7, the cam barrel acts against the aperture portion 38b and the spring plate. In other words, in the "night" position, the included angle referred to above increases so as to approach 107° or the relaxed state of the spring plate while in the "day" position, spring tension is increased due to a decrease in the included angle.

In the "night" position, the detent band 66 contacts a portion of the outer peripheral edge 78' of the spindle as seen in FIGURE 11, however, since the spring influence of the plate 6' has been decreased as described above, substantially no force is being exerted by the latter, and the mirror assembly is able to maintain the "night" position. Should the housing 2' be grasped by the vehicle operator and moved in a counterclockwise direction to adjust the mirror about the ball stud 10, this movement will serve to decrease the included angle of the ears 28' with a corresponding increase in spring force against the spindle 44', and thereby automatically flip the casing 2 to the "day" position. This provides an automatic "return" which is important in that, frequently a vehicle operator will fail to change the mirror position from "night" to "day" after the use of a vehicle. Thereafter, should he operate the vehicle during the daytime, he will immediately note that the mirror is out of adjustment, and proceed to manually adjust it for the proper rearward vision. Without this feature, the mirror would maintain the "night" position and be adjusted to a new view, however, with the modified form the mirror assembly automatically flips to the "day" position and adjustment can be made without requiring subsequent operation of the operating lever.

While but one form of the invention has been shown and described, other forms will now be apparent to those skilled in the art. Therefore, the embodiment shown in the drawings is merely for illustrative purposes, and is not intended to limit the scope of the invention which is defined by the claims which follow.

I claim:

1. An anti-glare rear view mirror comprising a housing in which there is positioned a mirror having two reflecting surfaces of different reflecting powers, which housing has an apertured wall through which a support extends into the housing interior; a mounting plate carried on said support within said housing, yieldable plate means having spaced points thereon respectively rigidly secured to said mounting plate and housing to hinge the latter for pivotal movement relative to said mounting plate about a horizontal axis, said yieldable plate means continuously urging pivotal movement of said housing about said axis in one direction relative to said mounting plate, and an operating lever having a first portion rotatably supported by said mounting plate and including a cam portion located on an axis eccentric to the axis of rotation of said first portion and engaging said housing under the influence of said plate means to control pivotal movement of said housing in said one direction and in a direction opposite thereto.

2. An anti-glare rear view mirror for vehicles comprising a mounting plate, a mirror housing surrounding said mounting plate and having an opening at the front therof, a mirror having two reflecting surfaces of different reflecting powers secured in and enclosing said opening, yieldable plate means having spaced points thereof respectively rigidly secured to said mounting plate and housing to hinge the latter on said mounting plate about a horizontal axis and continuously urge the housing pivotally in one direction relative to the mounting plate about said axis, means connected to said mounting plate within said housing and extending out of said housing for attachment to a vehicle, and an operating lever having a first portion rotatably supported by said mounting plate and including a cam portion located on an axis eccentric to the axis of rotation of said first portion and engaging said housing to control the extent of movement of said housing in said one direction under the influence of said yieldable plate means and to control the extent of movement of said housing relative to said mounting plate in opposition to said yieldable plate means.

3. An anti-glare rear view mirror comprising a housing in which there is positioned a mirror having two reflecting surfaces of different reflecting powers, which housing has an apertured wall through which a support extends into the housing interior; a substantially rigid mounting plate carried on said support within said housing, a flexible spring plate rigidly secured to said mounting plate within said housing and rigidly secured to said housing to hinge the latter for pivotal movement relative to said mounting plate about a horizontal axis, and an operating lever having a first portion rotatably supported by said mounting plate and including a cam portion located on an axis eccentric to the axis of rotation of said first portion and engaging said housing under the influence of said spring plate.

4. An anti-glare rear view mirror comprising a housing in which there is positioned a mirror having two reflecting surfaces of different reflecting powers, which housing has an apertured wall through which a support extends into the housing interior; a mounting plate carried on said support within said housing, spring plate means having spaced points thereon rigidly connected to said mounting plate and said housing to hinge the latter for pivotal movement relative to said mounting plate and support about a horizontal axis, an operating lever having a cam portion engaging said housing under the influence of said spring plate and including a portion rotatably supported on said mounting plate, said cam portion being located on an axis eccentric to the axis of rotation of said portion supported by the mounting plate, and cooperating stop means formed on the mounting plate and cam portion to limit movement of the operating lever to two positions to alternately present said reflecting surfaces to an observer.

5. An anti-glare rear view mirror comprising a housing in which there is positioned a mirror having two reflecting surfaces of different reflecting powers, which housing has an apertured wall through which a support extends into the housing interior; mounting means carried on said support within said housing and including yieldable plate means rigidly connected to said housing to hinge the latter for pivotal movement relative to said mounting means and support about a horizontal axis, said yieldable plate means continuously urging said housing in one direction relative to said mounting means about said axis, an operating lever having a first portion rotatably supported by said mounting means and including a cam portion rotatably engaging the housing under the influence of said plate means and located on an axis eccentric to the axis of rotation of said first portion, said lever being rotatable to control the movement of said housing in said one direction in response to urging of said yieldable plate means and to control the movement of the housing in an opposite direction in opposition to the force imposed by said yieldable plate means, and cooperatingly engageable detent means carried respectively by said lever and said mounting means to indicate a selected position of said housing in said opposite direction and to hold said housing in said position.

6. An anti-glare rear view mirror comprising a housing in which there is positioned a mirror having two reflecting surfaces of different reflecting powers, which housing has an apertured wall through which a support extends into the housing interior; mounting means carried on said support within said housing and including yieldable plate means rigidly connected to said housing to hinge the latter for pivotal movement relative to said mounting means and support about a horizontal axis, an operating lever having a first portion rotatably supported by said mounting means and including a cam portion engaging said housing under the influence of said plate means and located on an axis eccentric to the axis of rotation of said first portion, a flat surface on said lever within said housing, yieldable detent means on said mounting means engageable with said surface in one position of said lever and housing to hold the latter in said position, stop means formed with the mounting plate, and an extension on the cam portion adapted to contact the stop means for limiting the rotation of the actuating lever to two extreme positions separated by an angle of 90°.

7. An anti-glare rear view mirror comprising a housing in which there is positioned a mirror having two reflecting surfaces of different reflecting powers, which housing has an apertured wall through which a support extends into the housing interior; a substantially rigid mounting plate carried on said support within said housing, a flexible spring plate rigidly secured to said mounting plate within said housing and rigidly secured to said housing to hinge the latter for pivotal movement relative to said mounting plate about a horizontal axis, the connection of said spring plate to said housing continuously urging the latter in one direction relative to said mounting plate about said axis, an operating lever rotatably supported on said mounting plate and including an inner end within said housing and an outer end accessible exteriorly of said housing, cam means on the outer end of said lever engaging said housing under the influence of said spring plate and located on an axis eccentric to the axis of rotation of said inner end, said lever being rotatable to control pivotal movement of said housing in said one direction and to pivot said housing in the opposite direction to said connection of said spring plate to said mounting plate, and cooperatingly engageable detent means carried respectively by said lever and said spring plate to indicate a selected position of said housing in said opposite direction and to hold said housing in said position.

8. An anti-glare rear view mirror comprising a housing in which there is positioned a mirror having two reflecting surfaces with different reflecting powers, said housing including an apertured wall through which a support extends into the interior of said housing, a substantially rigid mounting plate within said housing and having a socket member engaging a portion of said support, a flexible spring plate secured to said mounting plate within said housing and including a socket member opposed to said first-named socket member and engaging another portion of said support to urge said socket members into adjustable frictional engagement with said support, flexible means formed integral with said spring plate and rigidly connected to said housing to hinge the latter for pivotal movement relative to said mounting plate about a horizontal axis, an operating lever having a first portion rotatably supported by said mounting plate and including a cam portion engaging the housing under the influence of said spring plate and located on an axis eccentric to the axis of rotation of said first portion, said first portion of the operating lever being located on an axis that passes through said support, and cooperating stop means formed on the mounting plate and cam portion to limit movement of the operating lever to two positions separated by an angle of 90°.

9. An anti-glare rear view mirror comprising a housing in which there is positioned a mirror having two reflecting surfaces of different reflecting powers, said housing including an upper wall and a lower wall connected by a rear wall having an aperture therein, a support extending through said aperture into the interior of said housing, a substantially rigid mounting plate within said housing and having a socket member engaging a portion of said support, a flexible spring plate rigidly secured to said mounting plate within said housing and including a socket member opposed to said first-named socket member and engaging another portion of said support to urge said socket members into adjustable frictional engagement with said support, spaced flexible ears formed integral with said spring plate and having their free ends rigidly connected to the upper wall of said housing to hinge the latter for pivotal movement relative to said mounting plate about a horizontal axis, said ears continuously urging said housing in one direction relative to said mounting plate about said axis, an operating lever including an inner end within said housing rotatably supported by the mounting plate and an outer end accessible exteriorly of said housing, a cam barrel on the outer end of said lever having its axis eccentric to the axis of rotation of said inner end of said lever and engaging said lower wall under the influence of said spring plate, and means on said mounting plate receiving and confining said inner end whereby said lever may be rotated to control the movement of said housing in said one direction in response to urging of said ears and to control the movement of the housing in an opposite direction in opposition to the force imposed by said ears.

10. An anti-glare rear view mirror comprising a housing in which there is positioned a mirror having two reflecting surfaces of different reflecting powers, said housing including a wall having an aperture therein, a support extending through said aperture into the interior of said housing, a substantially rigid mounting plate within said housing and having a socket member engaging a portion of said support, a flexible spring plate rigidly secured to said mounting plate within said housing and including a socket member opposed to said first-named socket member and engaging another portion of said support to urge said socket members into adjustable frictional engagement with said support, means formed integral with said spring plate and rigidly connected to said housing to hinge the latter for pivotal movement relative to said mounting plate about a horizontal axis, said last-named means continuously urging said housing in one direction relative to said mounting plate about said axis, an operating lever including an inner end within said housing rotatably supported by the mounting plate and an outer end accessible exteriorly of said housing, a cam barrel on the outer end of said lever having its axis eccentric to the axis of rotation of said inner end of said lever and engaging said housing under the influence of said spring plate, and means on said mounting plate respectively receiving and confining said inner end whereby said lever may be rotated to control the movement of said housing relative to said mounting plate.

11. An anti-glare rear view mirror comprising a housing in which there is positioned a mirror having two reflecting surfaces of different reflecting powers, said housing including a wall having an aperture therein, a support extending through said aperture into the interior of said housing, a substantially rigid mounting plate within said housing and having a socket member engaging a portion of said support, a flexible spring plate rigidly secured to said mounting plate within said housing and including a socket member opposed to said first-named socket member and engaging another portion of said support to urge said socket members into adjustable frictional engagement with said support, a pair of spaced flexible ears formed integral with said spring plate at a predetermined angle thereto and having their free ends rigidly connected to said housing to hinge the latter for pivotal movement relative to said mounting plate about a horizontal axis, said ears continuously urging said housing in one direction relative to said mounting plate about said axis so as to increase said angle and relieve the tension in the ears, an operating lever including an inner end within said housing rotatably supported by the mounting plate and having an outer end accessible exteriorly of said housing, a pair of spaced coaxial cylindrical barrels on the inner end of said lever, a pair of spaced coaxial tubular bearings on said mounting plate respectively receiving and confining said barrels whereby said lever may be rotated to control the movement of said housing in said one direction in response to urging of said ears and to control the movement of the housing in an opposite direction in opposition to the force imposed by said ears, cooperatingly engageable stop means carried respectively by the inner end of said lever and said mounting plate to indicate two different extreme positions of said housing relative to said mounting plate, detent means formed with the spring plate, a flat surface engageable by the detent means when the operating lever is in one of said two positions, and a curved surface formed adjacent the flat surface and engageable with the detent means in the other position of the operating lever so that the housing is shiftable to the said one of said two positions by manual movement of the housing.

12. An anti-glare rear view mirror comprising a housing in which there is positioned a mirror having two reflecting surfaces of different reflecting powers, said housing comprising an upper wall and a lower wall interconnected by a rear wall, said rear wall having an aperture through which a support extends into the housing interior, a mounting plate carried on said support within said housing, a yieldable spring plate rigidly secured to said mounting plate and housing to hinge the latter for pivotal movement relative to said mounting plate about a horizontal axis, said yieldable spring plate continuously urging pivotal movement of said housing in one direction relative to said mounting plate about said axis, an operating lever having a first portion rotatably supported by said mounting plate and including a cam portion located on an axis eccentric to the axis of rotation of said first portion, an oblong slot formed in said lower wall, said cam portion located in said slot and engaging said housing under the influence of said spring plate to control pivotal movement of said housing between a day position and a night position upon rotation of said lever, and cooperating stop means for limiting rotative movement of said lever whereby in said night position said cam portion is located in said slot so that manual pressure applied to the lower wall of the housing about said horizontal axis causes said housing to shift to the day position.

13. An anti-glare rear view mirror comprising a housing in which there is positioned a mirror having two reflecting surfaces of different reflecting powers, said housing comprising an upper wall and a lower wall interconnected by a rear wall, said rear wall having an aperture through which a support extends into the housing interior, a mounting plate carried on said support within said housing, a yieldable spring plate rigidly secured to said mounting plate and housing to hinge the latter for pivotal movement relative to said mounting plate about a horizontal axis, said yieldable spring plate continuously urging pivotal movement of said housing in one direction relative to said mounting plate about said axis, an operating lever having a first portion rotatably supported by said mounting plate and including a cam portion located on an axis eccentric to the axis of rotation of said first portion, a slot formed in said lower wall, said cam portion located in said slot and engaging said housing under the influence of said spring plate to control pivotal movement of said housing between a day position and a night position upon rotation of said lever, and cooperating stop means for limiting rotative movement of said lever whereby in said night position said cam portion is located in said slot so that manual pressure applied to the lower wall of the housing about said horizontal axis and towards said mounting plate causes said housing to shift to the day position.

14. An anti-glare rear view mirror comprising a housing in which there is positioned a mirror having two reflecting surfaces of different reflecting powers, said housing comprising an upper wall and a lower wall interconnected by a rear wall, said rear wall having an aperture through which a support extends into the housing interior, a mounting plate carried on said support within said housing, a yieldable spring plate rigidly secured to said mounting plate and housing to hinge the latter for pivotal movement relative to said mounting plate about a horizontal axis, said yieldable spring plate continuously urging pivotal movement of said housing in one direction relative to said mounting plate about said axis, an operating lever having a spindle portion rotatably supported by said mounting plate about a first axis and including a cam portion located on a second axis offset from the parallel to said first axis, an oblong slot formed in said lower wall with its major axis substantially parallel to the plane of said mirror, said cam portion located in said slot and engaging said housing under the influence of said spring plate to control pivotal movement of said housing between a day position and a night position upon rotation of said lever, and cooperating stop means for limiting rotative movement of said lever whereby in said night position said cam portion is located in said slot with said first and second axes lying along a line substantially parallel to said major axis so that manual pressure applied to the lower wall of the housing about said horizontal axis causes said housing to shift to the day position.

15. An anti-glare rear view mirror comprising a housing in which there is positioned a mirror having two reflecting surfaces of different reflecting powers, said housing comprising an upper wall and a lower wall interconnected by a rear wall, said rear wall having an aperture through which a support extends into the housing interior, a mounting plate carried on said support within said housing, a yieldable spring plate rigidly secured to said mounting plate and housing to hinge the latter for pivotal movement relative to said mounting plate about a horizontal axis, said yieldable spring plate continuously urging pivotal movement of said housing in one direction relative to said mounting plate about said axis, an operating lever having a first portion rotatably supported by said mounting plate about a first axis and including a cam portion located on a second axis offset from and parallel to said first axis of rotation of said first portion, an oblong slot formed in said lower wall with its major axis substantially parallel to the plane of said mirror, said cam portion located in said slot and engaging said housing under the influence of said spring plate to control pivotal movement of said housing between a day position and a night position upon rotation of said lever, detent means formed with the spring plate, a flat surface formed on the operating lever and engageable by the detent means when the housing is in the day position, a convex surface formed on said lever adjacent the flat surface and engageable by the detent means when the housing is in the night position, and cooperating stop means for limiting rotative movement of said lever whereby in said night position said cam portion is located in said slot with said first and second axes lying along a line substantially parallel to said major axis so that manual pressure applied to the lower wall of the housing about said horizontal axis causes said housing to shift to the day position.

References Cited by the Examiner

UNITED STATES PATENTS

| | | | |
|---|---|---|---|
| 3,004,473 | 10/1961 | Arthur et al. | 88—77 |
| 3,029,701 | 4/1962 | Nelson | 88—77 |

JEWELL H. PEDERSEN, *Primary Examiner.*

JOHN K. CORBIN, *Assistant Examiner.*